R. B. DISBROW.
DRIVING MECHANISM.
APPLICATION FILED OCT. 7, 1911.
1,044,759.
Patented Nov. 19, 1912.
3 SHEETS—SHEET 1.
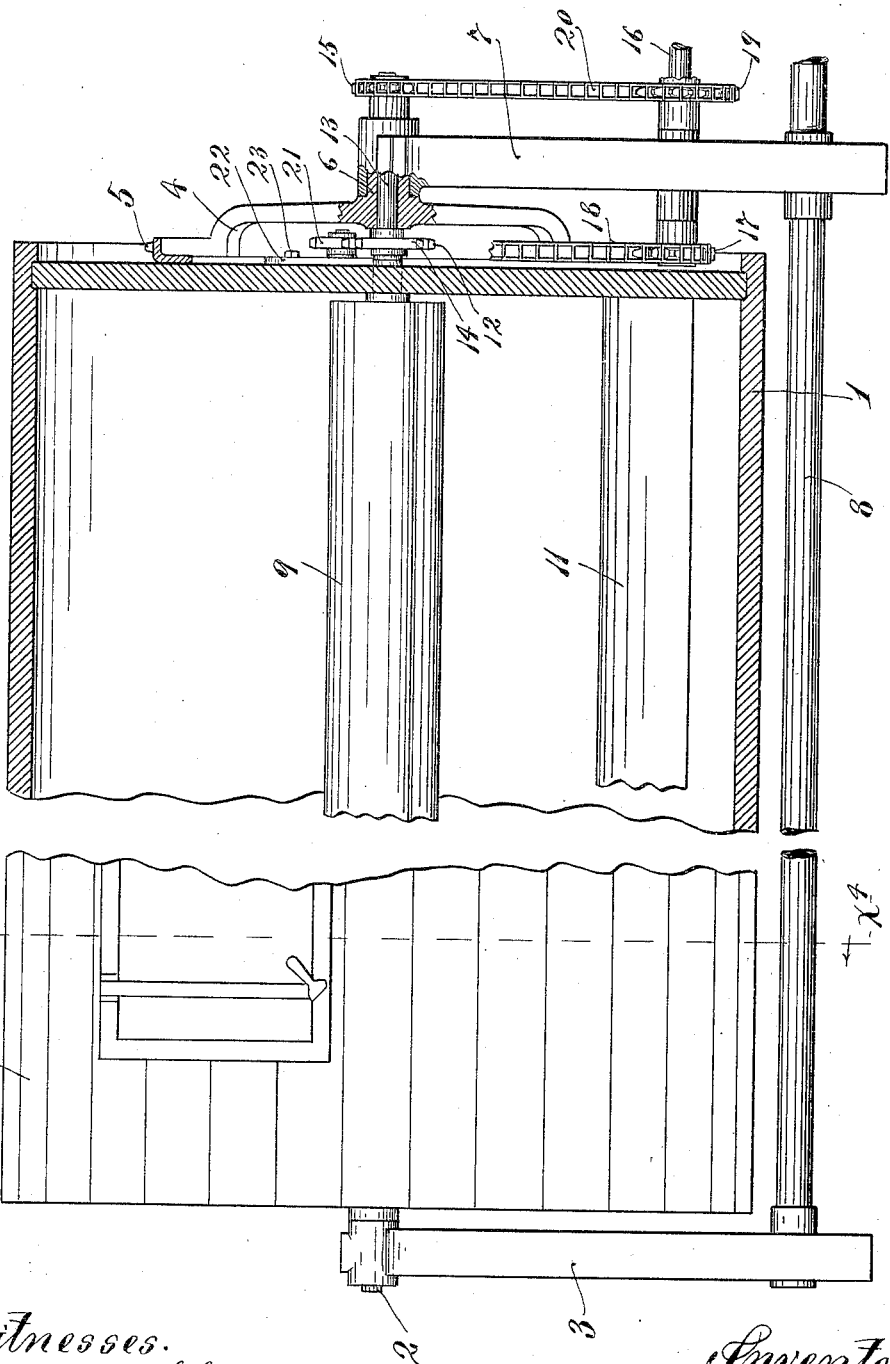
Witnesses.
A. H. Opsahl.
E. C. Skinkle.
Inventor.
R. B. Disbrow.
By his Attorneys
William M. Merchant R. B. DISBROW.
DRIVING MECHANISM.
APPLICATION FILED OCT. 7, 1911.
1,044,759.
Patented Nov. 19, 1912.
3 SHEETS—SHEET 2.
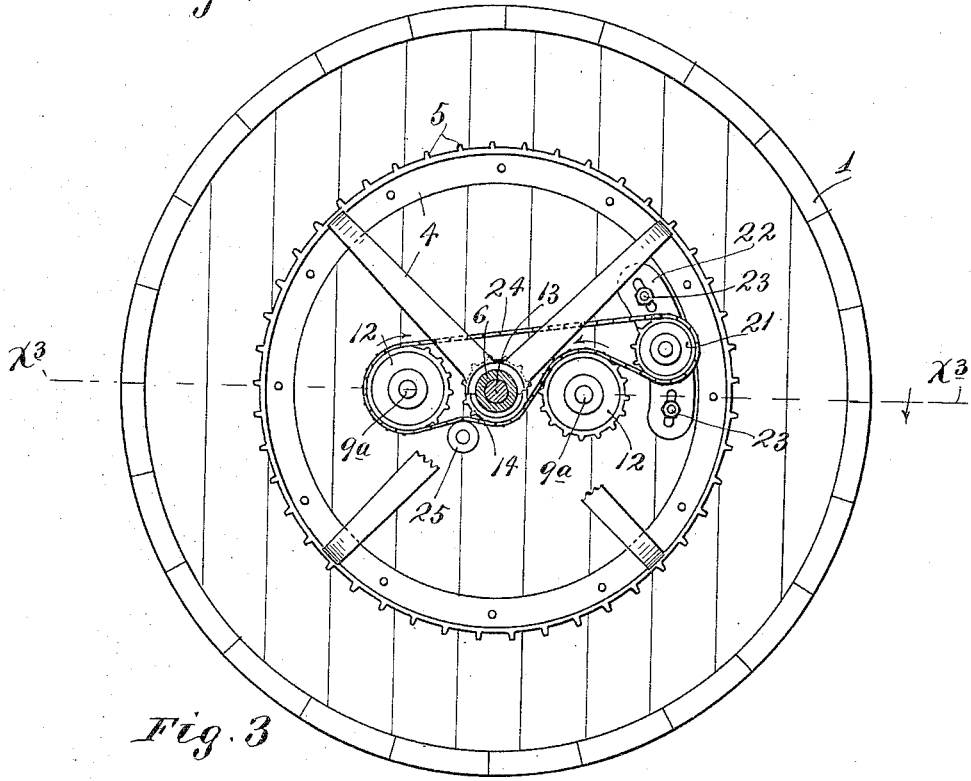
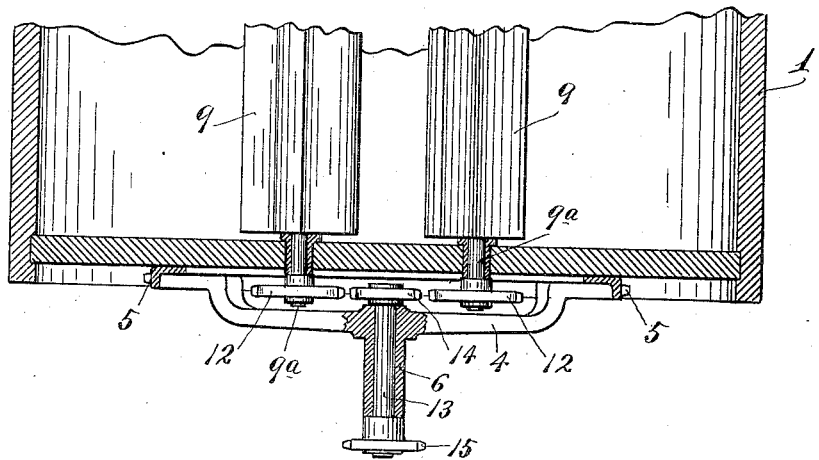
Witnesses
A. H. Opsahl.
E. C. Skinkle.
Inventor
R. B. Disbrow
By his Attorneys
Williamson Merchant

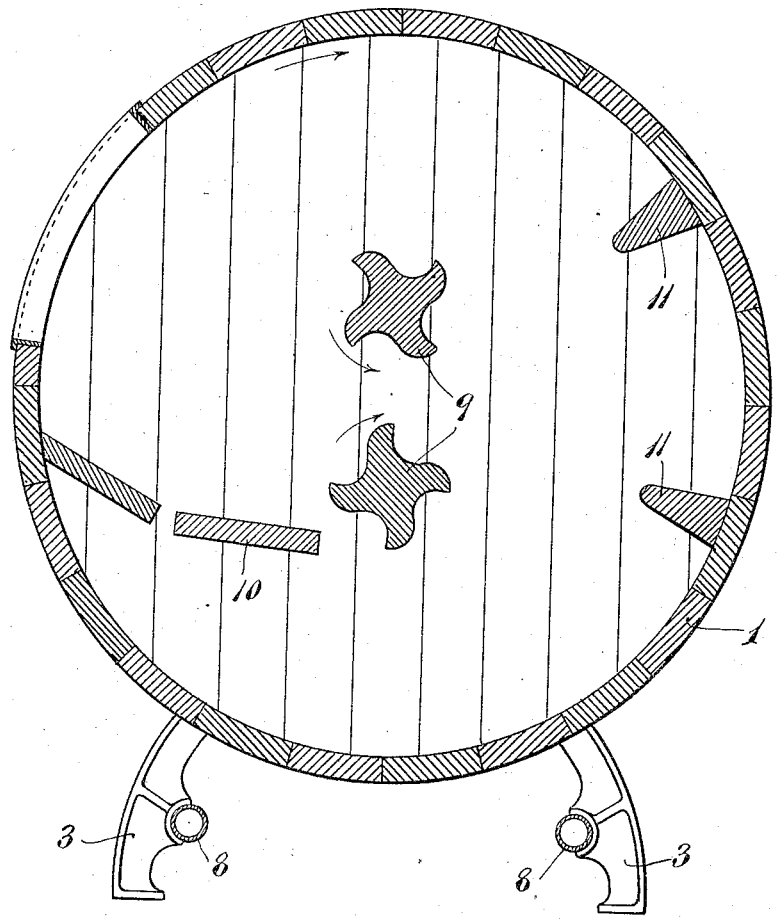

UNITED STATES PATENT OFFICE.

REUBEN B. DISBROW, OF OWATONNA, MINNESOTA.

DRIVING MECHANISM.

1,044,759.  Specification of Letters Patent.  Patented Nov. 19, 1912.

Application filed October 7, 1911. Serial No. 653,359.

*To all whom it may concern:*

Be it known that I, REUBEN B. DISBROW, a citizen of the United States, residing at Owatonna, in the county of Steele and State of Minnesota, have invented certain new and useful Improvements in Driving Mechanisms; and I do hereby declare the following to be a full, clear, and exact description of the invention, such as will enable others skilled in the art to which it appertains to make and use the same.

My invention has for its object to provide an improved driving mechanism for combined churns and butter workers of that type wherein coöperating working rollers are mounted to rotate within and are carried by a horizontal or approximately horizontal rotary drum.

To such ends, generally stated, the invention consists of the novel devices and combinations of devices hereinafter described and defined in the claims.

In a machine of this kind, more or less intricate chains of gears have been usually employed to impart rotary movements in the opposite directions to the coöperating butter working rollers and, in some instances, gears and sprocket wheels and chains have been combined to accomplish this result. Gears are more noisy than sprocket wheels and chains and the latter will run under less friction. My invention provides a drive for these coöperating rollers which runs under very light friction and almost silently, and this I accomplish by a novel arrangement of the sprocket wheels and chains whereby from a suitably located driving sprocket, the coöperating working rollers are driven in reverse directions by a single sprocket chain.

The invention is illustrated in the accompanying drawings wherein like characters indicate like parts throughout the several views.

Referring to the drawings, Figure 1 is a view partly in side elevation and partly in vertical section showing the combined churn and butter worker with my improved roller drive applied thereto; Fig. 2 shows the drum and roller driving connections in front elevation with some parts broken away, and with some parts sectioned and with the drum removed from its supporting frame; Fig. 3 is a horizontal section taken approximately on the line $x^3$ $x^3$ of Fig. 2, some parts being broken away; and Fig. 4 is a transverse vertical section taken on the line $x^4$ $x^4$ of Fig. 1.

The drum 1, which is of the ordinary or any suitable construction, is provided with a trunnion 2, at one end journaled in a frame pedestal 3, and at its other end, is provided with an off-set spider 4, formed with large sprocket 5, and with a hollow trunnion 6, which latter is journaled in a frame pedestal 7. The two frame pedestals 3 and 7 are shown as connected by the usual tie bars 8.

Within the drum is a pair of coöperating working rollers 9, both of which are located eccentric to the axis of the drum. The drum is also shown as provided with a suitable lifting shelf 10 and flights 11, which features, however, form no part of the present invention. The shafts $9^a$ of the working rollers 9, extend through the front head of the drum and are provided with sprockets 12.

A short counter shaft 13 is journaled in an extension through the hollow trunnion 6, and at its inner end is provided with a sprocket 14, and at its outer end with a sprocket 15.

Journaled in a suitable bearing on the front pedestal 7 is a power driven shaft 16, which, at its inner end, is provided with a sprocket 17 that alines with a larger drum sprocket 5. A sprocket chain 18 runs over the sprockets 17 and 5, to thereby rotate the drum from the said shaft 16. Also, on the shaft 16 is a sprocket 19 over which, and the sprocket 15 runs a sprocket chain 20. The sprocket 19 may be secured to the shaft 16 and driven therefrom, but usually it will be indirectly driven through other mechanism, not shown, such for instance, as that disclosed and claimed in my pending application S. N. 591,562, filed November 10, 1910, entitled "Combined churn and butter workers."

The numeral 21 indicates an idle guide sprocket applied to the front drum head outward of one of the roller sprockets 12. This sprocket 21 is preferably made adjustable circumferentially of the drum, and to this end, is journaled to a bearing plate 22 attached to the said drum head by a slot and bolt connection 23. A sprocket chain 24 is passed under the centrally located driving sprocket 14, under and over one of the roller sprockets 12, over the other roller sprocket 12 and under and over the idle sprocket 21.

By thus passing the sprocket chain, only, over the roller sprocket which is adjacent to the idle sprocket, an arrangement is provided whereby the coöperating working rollers 9 will be driven in reverse directions, as required to properly work the butter between the rollers. The slack of the chain may be taken up and the chain given the proper tension by adjustments of the idle sprocket 21. To hold the sprocket chain 24 in more secure and better engagement with the driving sprockets 14, an idle guide roll 25 is also preferably journaled to the drum head adjacent to the said sprocket.

So far as I am aware, I am the first to provide, in a combined churn and butter worker, or similar machine including coöperating rollers, any arrangement whereby the said rollers are reversely driven from a single sprocket chain, and hence, desire to claim this feature broadly.

The roller drive above described and illustrated in the drawings has been put into actual use in a large number of commercial machines and it has been found entirely satisfactory. It is almost silent in its action, and experiments have shown that it runs under much less friction than in drive connections including spur gears in other forms of cog wheels. Also, the drive is of small cost, strong and durable.

In the specification and in the claims, the expression "over and under", as descriptive of the way the chain is made to run over the roller sprockets, is used for the sake of convenience in expression. Of course, in one position of the drum the stated relations are just reversed in respect to the observer.

What I claim is:

1. The combination with a rotary body and means for rotating the same, of a pair of eccentrically located driven sprockets in respect to the axis of rotation of said body, journaled to and carried by said rotary body, a driving sprocket having its axis coincident with the axis of rotation of said body, of a guide wheel journaled to said body and located outward of one of said driven sprockets, and a single sprocket chain driven by said axially located driving sprocket, passed over and under said driven sprockets and around said guide wheel.

2. The combination with a rotary body and means for rotating the same, of a pair of eccentrically located driven sprockets in respect to the axis of rotation of said body, journaled to and carried by said rotary body, a driving sprocket having its axis coincident with the axis of rotation of said body, of a guide wheel journaled to said body and located outward of one of said driven sprockets, and a single sprocket chain driven by said axially located driving sprocket, passed over and under said driven sprockets and around said guide wheel, the said guide wheel being adjustable to vary or take up the slack of said sprocket chain.

3. The combination with a rotary body and means for rotating the same, of a pair of eccentrically located driven sprockets in respect to the axis of rotation of said body, journaled to and carried by said rotary body, a driving sprocket having its axis coincident with the axis of rotation of said body, of a guide wheel journaled to said body and located outward of one of said driven sprockets, and a single sprocket chain driven by said axially located driving sprocket, passed over and under said driven sprockets and around said guide wheel, the said driven sprockets having shafts projecting in one direction and the said axial driving sprocket having a shaft projected in the opposite direction, and means connected to the latter shaft for driving said axial sprocket.

In testimony whereof I affix my signature in presence of two witnesses.

REUBEN B. DISBROW.

Witnesses:
A. W. SAWYER,
J. A. SAWYER.

---

Copies of this patent may be obtained for five cents each, by addressing the "Commissioner of Patents, Washington, D. C."